United States Patent
Kay

(10) Patent No.: US 7,617,517 B2
(45) Date of Patent: Nov. 10, 2009

(54) CABLE MODEM INCLUDING FILTERING BASED ON FREQUENCY BAND

(75) Inventor: Shin-Woong Kay, Seongnam-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 763 days.

(21) Appl. No.: 11/004,827

(22) Filed: Dec. 7, 2004

(65) Prior Publication Data

US 2005/0172327 A1 Aug. 4, 2005

(30) Foreign Application Priority Data

Jan. 30, 2004 (KR) .................. 10-2004-0006307

(51) Int. Cl.
*H04N 7/173* (2006.01)
(52) U.S. Cl. .................. 725/111; 375/258
(58) Field of Classification Search .......... 725/110, 725/111, 124–129, 119, 120, 121
See application file for complete search history.

(56) References Cited

U.S. PATENT DOCUMENTS

| | | | |
|---|---|---|---|
| 4,464,049 A * | 8/1984 | Schroeder | 356/218 |
| 5,825,131 A * | 10/1998 | Kim | 315/8 |
| 6,598,232 B1 * | 7/2003 | McAlear | 725/126 |
| 6,622,304 B1 * | 9/2003 | Carhart | 725/74 |
| 6,868,158 B2 * | 3/2005 | Takahashi et al. | 379/406.04 |
| 6,868,552 B1 * | 3/2005 | Inoue et al. | 725/125 |
| 7,017,176 B1 * | 3/2006 | Lee et al. | 725/111 |
| 7,366,286 B1 * | 4/2008 | Shenoi | 379/93.08 |
| 2002/0023273 A1 | 2/2002 | Song | |
| 2002/0049038 A1 | 4/2002 | Sorrells et al. | |
| 2002/0073431 A1 * | 6/2002 | Nikolich | 725/111 |
| 2002/0141544 A1 * | 10/2002 | Brown et al. | 379/29.01 |
| 2002/0176524 A1 | 11/2002 | Popper et al. | |
| 2002/0178454 A1 | 11/2002 | Antoine et al. | |
| 2003/0012271 A1 | 1/2003 | McReynolds et al. | |
| 2003/0022631 A1 | 1/2003 | Rhodes et al. | |
| 2003/0033608 A1 | 2/2003 | Chang et al. | |
| 2003/0046706 A1 | 3/2003 | Rakib | |
| 2003/0066088 A1 | 4/2003 | Jung | |
| 2003/0100349 A1 * | 5/2003 | Cho | 455/567 |

(Continued)

FOREIGN PATENT DOCUMENTS

JP 06-216826 8/1994

(Continued)

OTHER PUBLICATIONS

Office action from the Japanese Patent Office issued in Applicant's corresponding Japanese Patent Application No. 2005-009829 dated Dec. 11, 2007.

*Primary Examiner*—Andrew Y Koenig
*Assistant Examiner*—Carmine Malangone
(74) *Attorney, Agent, or Firm*—Robert E. Bushnell, Esq.

(57) ABSTRACT

In a Hybrid Fiber Coaxial (HFC) network using a Set Top Box (STB) or a cable modem, the cable STB or the cable modem includes respective High-Pass Filters (HPFs) having different passband frequencies to transmit an upstream signal from the cable STB or the cable modem to the HFC network through paths having different passband frequencies depending on states of the HFC network so that the upstream frequency band of 5 to 42 MHz is available.

15 Claims, 3 Drawing Sheets

U.S. PATENT DOCUMENTS

2003/0208775 A1 11/2003 Roberts et al.
2006/0195874 A1* 8/2006 Abe et al. .................. 725/100

FOREIGN PATENT DOCUMENTS

| JP | 09-312750 | 12/1997 |
|----|-----------|---------|
| JP | 10215148 | 8/1998 |
| JP | 11-177790 | 7/1999 |
| JP | 2000-151272 | 5/2000 |
| JP | 2000-307456 | 11/2000 |
| JP | 2002-135749 | 5/2002 |
| JP | 2002-152709 | 5/2002 |
| JP | 2003-125372 | 4/2003 |
| JP | 2003-209829 | 7/2003 |
| JP | 2003-298379 | 10/2003 |
| JP | 2003-298445 | 10/2003 |
| JP | 2004-583147 | 10/2004 |
| WO | WO 02/076081 | 9/2002 |

* cited by examiner

CABLE MODEM INCLUDING FILTERING BASED ON FREQUENCY BAND

CLAIM OF PRIORITY

This application makes reference to, incorporates the same herein, and claims all benefits accruing under 35 U.S.C. §119 from an application for CABLE MODEM AND FILTERING METHOD BASED ON FREQUENCY BAND IN THE SAME earlier filed in the Korean Intellectual Property Office on 30 Jan. 2004 and there duly assigned Serial No. 2004-6307.

BACKGROUND OF THE INVENTION

1. Field of the Invention

The present invention relates to a cable modem including filtering based on a frequency band in the cable modem and, more particularly, to a cable modem including filtering based on a frequency band in the cable modem in which an upstream signal is transmitted via respective different Hybrid Fiber Coaxial (HFC) transmission paths embedded in the cable modem or a cable Set Top Box (STB).

2. Description of the Related Art

A cable modem transmits an upstream signal to a Cable Modem Termination System (CMTS) and receives a downstream signal from the CMTS over an HFC network.

A cable modem or a cable STB transmits and receives data and a video signal using the HFC network. The performance of the entire HFC network depends on communication between the CMTS/head end equipment and the cable modem/cable STB. An upstream signal transmitted by the cable modem or the cable STB plays the most important role.

The following patents each discloses features in common with the present invention but do not teach or suggest the inventive features specifically recited in the present application: U.S. patent application Ser. No. 2003/0012271 to McReynolds et al., entitled *MULTI-MODE BI-DIRECTIONAL COMMUNICATIONS DEVICE INCLUDING A DIPLEXER HAVING SWITCHABLE LOWPASS FILTERS*, published on Jan. 16, 2003; U.S. patent application Ser. No. 2002/0178454 to Antoine et al., entitled *BROADCAST TELEVISION AND SATELLITE SIGNAL SWITCHING SYSTEM AND METHOD FOR TELEPHONY SIGNAL INSERTION*, published on Nov. 28, 2002; U.S. patent application Ser. No. 2002/0023273 to Song, entitled *APPARATUS FOR PROVIDING A MULTIPLE INTERNET CONNECTION SERVICE USING A HYBRID FIBER COAXIAL CABLE NETWORK*, published on Feb. 21, 2002; U.S. patent application Ser. No. 2003/0022631 to Rhodes et al., entitled *MULTI-MODE BIDIRECTIONAL COMMUNICATIONS DEVICE INCLUDING A DIPLEXER HAVING A SWITCHABLE NOTCH FILTER*, published on Jan. 30, 2003; U.S. patent application Ser. No. 2002/0176524 to Popper et al., entitled *INGRESS NOISE REDUCTION IN A DIGITAL RECEIVER*, published on Nov. 28, 2002; U.S. patent application Ser. No. 2002/0049038 to Sorrells et al., entitled *WIRELESS AND WIRED CABLE MODEM APPLICATIONS OF UNIVERSAL FREQUENCY TRANSLATION TECHNOLOGY*, published on Apr. 25, 2002; U.S. patent application Ser. No. 2003/0033608 to Chang et al., entitled *BTI RF MODULE WITH FILTERING*, published on Feb. 13, 2003; U.S. patent application Ser. No. 2003/0046706 to Rakib, entitled *ACTIVE CABLE MODEM OUTSIDE CUSTOMER PREMISES SERVICING MULTIPLE CUSTOMER PREMISES*, published on Mar. 6, 2003; U.S. patent application Ser. No. 2003/0208775 to Roberts et al., entitled *SYSTEM, METHOD AND APPARATUS FOR COORDINATION OF CHANNEL QUALITY ASSESSMENT AND INGRESS FILTERING IN CABLE MODEM SYSTEMS*, published on Nov. 6, 2003; U.S. patent application Ser. No. 2003/0066088 to Jung, entitled *BIDIRECTIONAL TRUNK AMPLIFIER AND CABLE MODEM FOR CABLE HYBRID FIBER AND COAX NETWORK WHICH UTILIZES AN UPSTREAM PILOT SIGNAL*, published on Apr. 3, 2003.

SUMMARY OF THE INVENTION

An object of the present invention to provide a cable modem and filtering method based on a frequency band in the cable modem in which upstream signals are transmitted through respective different HPF transmission paths embedded in the cable modem or cable STB.

According to an aspect of the present invention for achieving the aforementioned object, a cable modem is provided comprising: a Central Processing Unit (CPU) adapted to output a control signal to perform different high-pass filtering depending on frequency bands of upstream signals transmitted to a Hybrid Fiber Coaxial (HFC) network; a multiplex High-Pass Filter (HPF) adapted to filter the inputted upstream signals through different paths based on their respective frequency bands, the multiplex HPF including a plurality of HPFs having different passband frequencies; and a High-Pass Filter (HPF) selection unit adapted to select one of the plurality of HPFs included in the multiplex HPF in accordance with the control signal to pass the upstream signals through the different paths.

The cable modem can further comprise an upstream signal control unit adapted to receive the upstream signals from the CPU and to adjust amplitudes of the received upstream signals and to output the resultant upstream signals.

The cable modem can further comprise a transformer adapted to receive an output signal of the upstream signal control unit and to isolate a next stage from the upstream signal control unit.

The cable modem can further comprise a Low-pass Filter (LPF) adapted to low-pass filter the upstream signals filtered by the HPF, and to send the resultant filtered signals to the HFC network, the HPF being selected by the HPF selection unit.

The cable modem can further comprise a tuner adapted to transmit the upstream signals to the HFC network, the high-frequency components of the upstream signals having been removed by the LPF.

The CPU is adapted to output different control signals according to respective frequency bands of the upstream signals.

The HPF selection unit includes a transistor adapted to be turned on or off in accordance with the control signal of the CPU, and a relay adapted to switch a connection to a corresponding HPF of the multiplex HPF in response to the on or off operation of the transistor.

The multiplex HPF includes a first HPF adapted to pass a frequency of at least 10 MHz to high-pass filter upstream signals having a frequency between 10 MHz and 20 MHz.

The multiplex HPF includes a second HPF adapted to pass a frequency of at least 20 MHz to high-pass filter upstream signals having a frequency of at least 20 MHz.

The HPF selection unit is adapted to bypass the upstream signals so that upstream signals having a frequency between 5 MHz and 10 MHz are not filtered by the multiplex HPF.

The cable modem can further comprise a control gate adapted to be turned on or off by the control signal outputted from the CPU when transmitting the upstream signals, the control gate being in an on state only upon transmitting the upstream signals to the HFC network.

The cable modem can further comprise a capacitor adapted to remove a DC current component flowing into the HPF.

The cable modem can further comprise a splitter connected to the multiplex HPF and adapted to isolate the delivered signals from each other.

According to an aspect of the present invention for achieving the aforementioned object, a filtering method is provided comprising: determining a transmission frequency band of upstream signals received from a Hybrid Fiber Coaxial (HFC) network, the upstream signals being transmitted to the HFC network; outputting a control signal to perform different high-pass filtering depending on the respective transmission frequency band of the upstream signals; selecting a high-pass filtering path corresponding to the frequency band from among a plurality of different high-pass filtering paths in response to the control signal; and filtering the upstream signal with the selected high-pass filtering path and transmitting the resultant signal to the HFC network.

The frequency bands for upstream transmission comprise: 5 MHz to 10 MHz, 10 MHz to 20 MHz, and 20 MHz to 42 MHz.

According to an aspect of the present invention for achieving the aforementioned object, a filtering method is provided comprising: outputting a control signal to perform different high-pass filtering depending on frequency bands of upstream signals transmitted to a Hybrid Fiber Coaxial (HFC) network; filtering the inputted upstream signals through different paths based on their respective frequency bands with a multiplex High-Pass Filter (HPF) including a plurality of HPFs having different passband frequencies; and passing the upstream signals through the different paths by selecting one of the plurality of HPFs included in the multiplex HPF in accordance with the control signal.

The method can further comprise receiving the upstream signals and adjusting amplitudes of the received upstream signals and outputting the resultant upstream signals.

The method can further comprise receiving an output signal of an upstream signal control unit and isolating a next stage from the upstream signal control unit with a transformer.

The method can further comprise low-pass filtering the upstream signals filtered by the HPF and sending the resultant filtered signals to the HFC network.

The method can further comprise removing the high-frequency components of the upstream signals and transmitting the resultant upstream signals to the HFC network.

The method can further comprise outputted different control signals according to respective frequency bands of the upstream signals.

The method can further comprise turning a transistor on or off in accordance with the control signal and switching a connection to a corresponding HPF of the multiplex HPF in response to the on or off operation of the transistor.

The method can further comprise passing a frequency of at least 10 MHz to high-pass filter upstream signals having a frequency between 10 MHz and 20 MHz with a first HPF of the multiplex HPF.

The method can further comprise passing a frequency of at least 20 MHz to high-pass filter upstream signals having a frequency of at least 20 MHz with a second HPF of the multiplex HPF.

The method can further comprise bypassing the upstream signals so that upstream signals having a frequency between 5 MHz and 10 MHz are not filtered by the multiplex HPF.

The method can further comprise turning a control gate on or off with the control signal when transmitting the upstream signal, the control gate being in an on state only upon transmitting the upstream signal to the HFC network.

The method can further comprise removing a DC current component flowing into the HPF.

The method can further comprise isolating the delivered signals outputted by the multiplex HPF from each other.

BRIEF DESCRIPTION OF THE DRAWINGS

The above and other features and advantages of the present invention will become more apparent to those of ordinary skill in the art by describing in detail exemplary embodiments of the present invention with reference to the attached drawings in which.

DETAILED DESCRIPTION OF THE INVENTION

Figure 1:
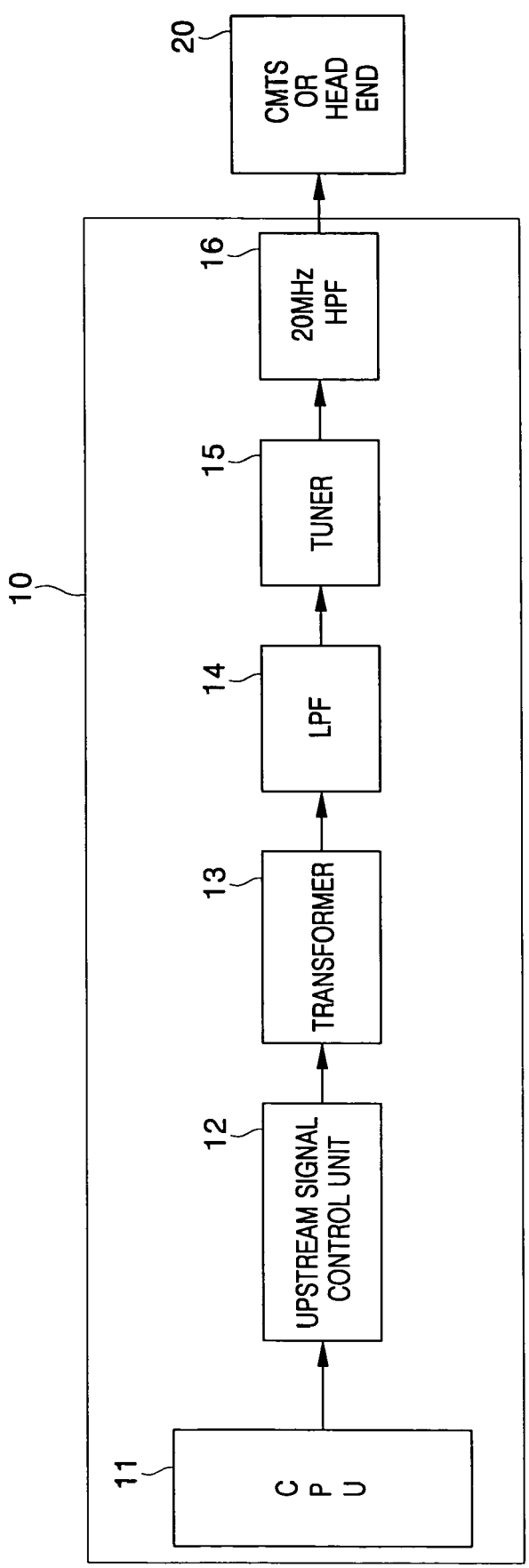
FIG. 1 is a block diagram of a cable modem.

FIG. 1 is a block diagram of a cable modem.

Referring to FIG. 1, a cable modem 10 comprises a Central Processing Unit (CPU) 11, an upstream signal control unit 12, a transformer 13, a Low-Pass Filter (LPF) 14, a tuner 15, and a 20 MHz High-Pass Filter (HPF) 16.

The CPU 11 controls the entire operation of the cable modem 10. It generates a first enable signal EN1 and a second enable signal EN2 and outputs data over a data bus.

The cable STB or cable modem will send an upstream signal to the HFC network to communicate with the CMTS or head end 20. The CPU 11 of the cable STB or cable modem receives signal information that the CMTS or head end 20 transmits over the HFC network downstream, and determines the frequency of the upstream signal based on the received information.

That is, the frequency of the upstream signal is not determined by the cable STB or cable modem but is determined by the CMTS or head end 20 based on signal states on the HFC network.

In other words, if the CMTS or head end 20 sends a signal containing an upstream signal frequency and other information to the corresponding cable STB or cable modem 10, the CPU 11 in the corresponding cable STB or cable modem 10 receives the signal to determine a frequency for upstream transmission. The CPU 11 uses the determined frequency as a frequency for transmission.

The upstream signal control unit 12 receives data as the upstream signal and adjusts gain of the signal under the control of the CPU 11.

The transformer 13 receives an output signal from the upstream signal control unit 12, and isolates the next stage from the upstream signal control unit 12.

The LPF 14 receives an output signal from the transformer 13 to remove a high-frequency component from the output signal and to pass only a signal having a frequency of 42 MHz or less. That is, signals having a frequency of 42 MHz or more are removed by the LPF 14 since the upstream signal used in the modem employs only a 5 to 42 MHz frequency band.

The tuner 15 sends the upstream signal, the high-frequency component of which has been removed, to the HFC network.

The 20 MHz HPF 16 solves a noise problem in the upstream signal. The 20 MHz HPF 16 is adapted to block a 5 to 20 MHz frequency band and to improve the HFC network because the 5 to 20 MHz frequency band often includes noise in the HFC networks. In a typical case, therefore, a 5 to 20 MHz frequency band of the 5 to 42 MHz frequency band of the upstream signal is not conventionally used in the entire HFC network because that frequency band often includes noise.

A transmission unit of the cable modem shown in FIG. 1 transmits the upstream signal to the CMTS over the HFC network. The upstream signal, data, has its amplitude adjusted by the upstream signal control unit 12 under the control of the CPU 11. The signal transmitted from the cable modem 10 to the CMTS is not always constant in amplitude but is varied with commands from the CMTS. This is because the upstream signal can reach the CMTS only when the upstream signal is transmitted after being amplified in proportion to the distance between the cable modem and the CMTS. The transformer 13 serves to isolate the LPF 14 from the upstream signal control unit 12.

The LPF 14 removes a high-frequency component of the upstream signal, which has been adjusted in amplitude by the upstream signal control unit 12. The LPF 14 removes signals of a frequency equal to or greater than 42 MHz because the upstream signal employs only a 5 to 42 MHz frequency band.

However, since the HFC network using the cable STB or cable modem employs the 20 MHz HPF 16 positioned at a front stage of the cable STB or cable modem, it is impossible to use the 5 to 20 MHz frequency band in the entire HFC network regardless of whether or not that frequency band includes noise.

The upstream frequency band ranges from 5 to 42 MHz, which is not broad. Thus, use of the 20 MHz HPF results in blocking a 20 MHz band. This incurs a problem in that a bandwidth available for the frequency of the upstream signal becomes narrow.

Figure 2:
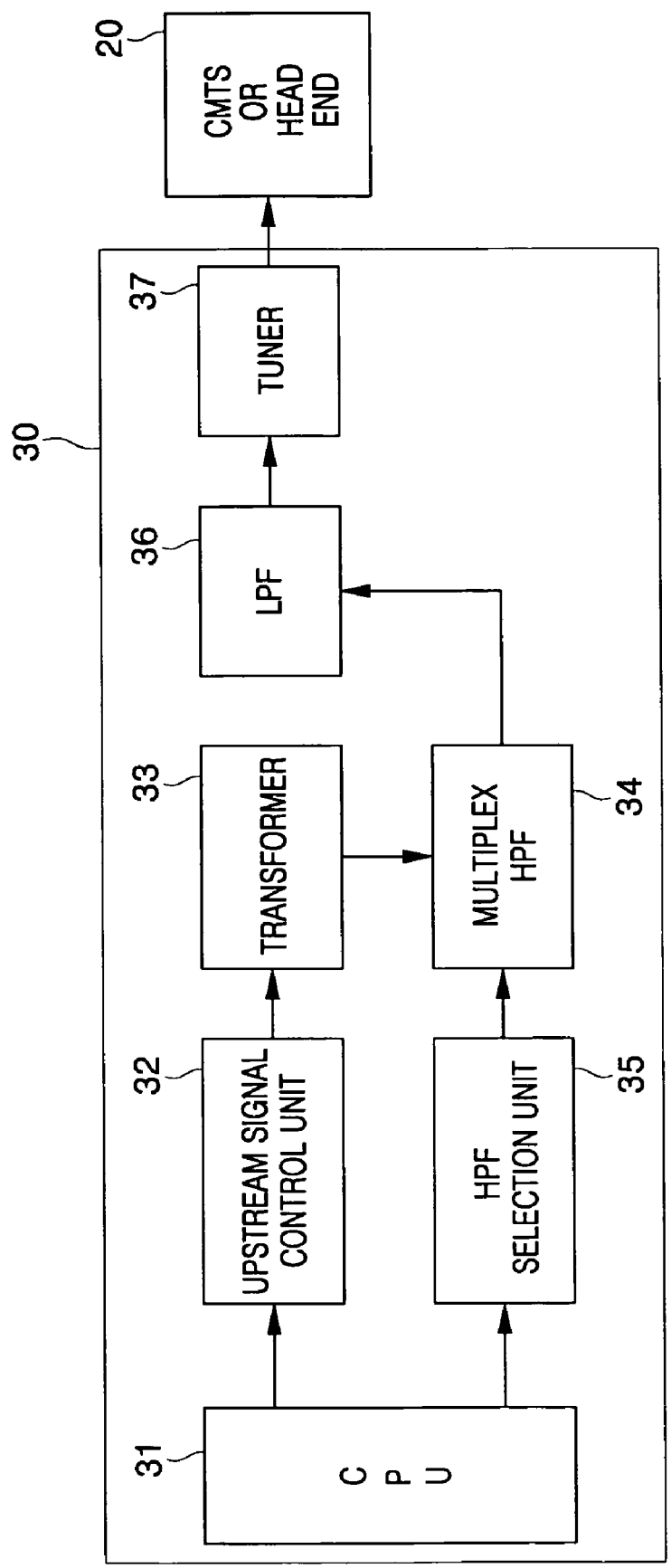
FIG. 2 is a block diagram of a cable modem according to an embodiment of the present invention.

FIG. 2 is a block diagram of a cable modem according to an embodiment of the present invention.

Referring to FIG. 2, the cable modem is composed of a CPU 31, an upstream signal control unit 32, a transformer 33, a multiplex HPF 34, an HPF selection unit 35, an LPF 36 and a tuner 37.

Although not shown, the multiplex HPF 34 consists of a first HPF and a second HPF. The first HPF passes a frequency band of 10 MHz or more, and the second HPF passes a frequency band of 20 MHz or more.

The HPF selection unit 35 selectively switches connections between the transformer 33 and the multiplex HPF 34, and is controlled by the CPU 31. That is, the HPF selection unit 35 performs a function of selecting a connection of either the first HPF or the second HPF included in the multiplex HPF 34 to the transformer 33. The HPF selection unit 35 can make three connections between the transformer 33 and the multiplex HPF 34; a connection between the transformer 33 and the first HPF, a connection between the transformer 33 and the second HPF, and a connection in which the transformer 33 is neither connected to the first HPF nor to the second HPF so that the signal from the transformer is passed as is.

The LPF 36 receives an output signal from the multiplex HPF 34 and removes a high-frequency component from the output signal. It passes only signals having a frequency of 42 MHz or less. The LPF 36 remove signals having a frequency of 42 MHz or more since the upstream signal used in the modem employs only a 5 to 42 MHz frequency band.

The tuner 37 sends the upstream signal, the high-frequency component of which has been removed by the LPF 36, to an HFC network.

When sending the upstream signal, the CPU 31 outputs upstream signal data and an enable signal to the upstream signal control unit 32. The CPU 31 also outputs a control signal to control the HPF selection unit 35 depending on a frequency band for upstream transmission that the CMTS or head end 20 has transmitted. The frequency band for upstream transmission can be classified into three bands; less than 10 MHz (i.e., 5 MHz to 10 MHz), 10 MHz to 20 MHz, and 20 MHz or more (i.e., 20 MHz to 42 MHz).

When the CPU 31 transmits the upstream signal, the CPU 31 also outputs a corresponding control signal to the HPF selection unit 35 depending on the frequency band for upstream transmission that the CMTS or head end 20 has transmitted.

If the upstream transmission frequency that the CMTS or head end 20 has transmitted is less than 10 MHz, the CPU 31 outputs a first control signal to the HPF selection unit 35 so that the transformer 33 is neither connected to the first HPF nor to the second HPF of the multiplex HPF 34 and the signal from the transformer 33 is passed as is. By doing so, the upstream signal outputted from the transformer 33 is not filtered by the multiplex HPF 34 and is transmitted to the HFC network via the LPF 36 and the tuner 37.

If the upstream transmission frequency that the CMTS or head end 20 has transmitted is 20 MHz or more, the CPU 31 outputs a second control signal to the HPF selection unit 35 so that the transformer 33 is connected to the second HPF of the multiplex HPF 34. By doing so, the upstream signal outputted from the transformer 33 is filtered by the second HPF of the multiplex HPF 34 and is transmitted to the HFC network via the LPF 36 and the tuner 37.

If the upstream transmission frequency that the CMTS or head end 20 has transmitted is between 10 MHz and 20 MHz, then the CPU 31 outputs a third control signal to the HPF selection unit 35 so that the transformer 33 is connected to the first HPF of the multiplex HPF 34. By doing so, the upstream signal outputted from the transformer 33 is filtered by the first HPF of the multiplex HPF 34 and is transmitted to the HFC network via the LPF 36 and the tuner 37.

When transmitting the upstream signal to the HFC network under the control of the CPU 31, the upstream signal control unit 32 performs a function of adjusting the amplitude of the corresponding frequency of the upstream signal depending on the upstream transmission frequency transmitted by the CMTS or head end 20. Thus, the upstream signal control unit 32 includes an Automatic Gain Control (AGC) module (not shown) to produce the upstream signal having a stabilized amplitude.

The transformer 33 receives the output signal of the upstream signal control unit 32 and isolates the next stage from the upstream signal control unit 32.

If the upstream transmission frequency transmitted by the CMTS or head end is less than 10 MHz, then the CPU 31 outputs an upstream signal of the corresponding transmission frequency and an enable signal to the upstream control unit 32. Accordingly, the upstream control unit 32 adjusts the amplitude of the upstream signal and outputs the resultant signal in response to the enable signal of the CPU 31. The CPU 31 outputs a first control signal to the HPF selection unit 35. Accordingly, the HPF selection unit 35 is operative to block the transformer 33 from being neither connected to the first HPF nor to the second HPF of the multiplex HPF 34 so that the upstream signal is passed without being filtering. Thus, the upstream signal outputted from the transformer 33 is not filtered by the multiplex HPF 34 and is transmitted via the LPF 36 and the tuner 37 to the HFC network.

If the upstream transmission frequency transmitted by the CMTS or head end 20 is 20 MHz and more, then the CPU 31 outputs an upstream signal of the corresponding transmission frequency and an enable signal to the upstream control unit 32. The upstream control unit 32 adjusts the amplitude of the upstream signal in response to the enable signal of the CPU 31 and outputs the resultant signal. The CPU 31 also outputs a second control signal to the HPF selection unit 35. In response thereto, the HPF selection unit 35 is operative to enable the transformer 33 to be connected to the second HPF of the multiplex HPF 34. Thus, the upstream signal outputted from the transformer 33 is filtered by the second HPF of the multiplex HPF 34 and is thereafter transmitted to the HFC network via the LPF 36 and the tuner 37.

If the upstream transmission frequency transmitted by the CMTS or head end 20 is between 10 MHz and 20 MHz, then the CPU 31 outputs an upstream signal of the corresponding transmission frequency and an enable signal to the upstream control unit 32. The upstream control unit 32 adjusts the amplitude of the upstream signal in response to the enable signal of the CPU 31 and outputs the resultant signal. The CPU 31 also outputs a third control signal to the HPF selection unit 35. In response thereto, the HPF selection unit 35 operates to allow the transformer 33 to be connected to the first HPF of the multiplex HPF 34. Thus, the upstream signal outputted from the transformer 33 is filtered by the first HPF of the multiplex HPF 34 and then is transmitted to the HFC network via the LPF 36 and the tuner 37.

Figure 3:
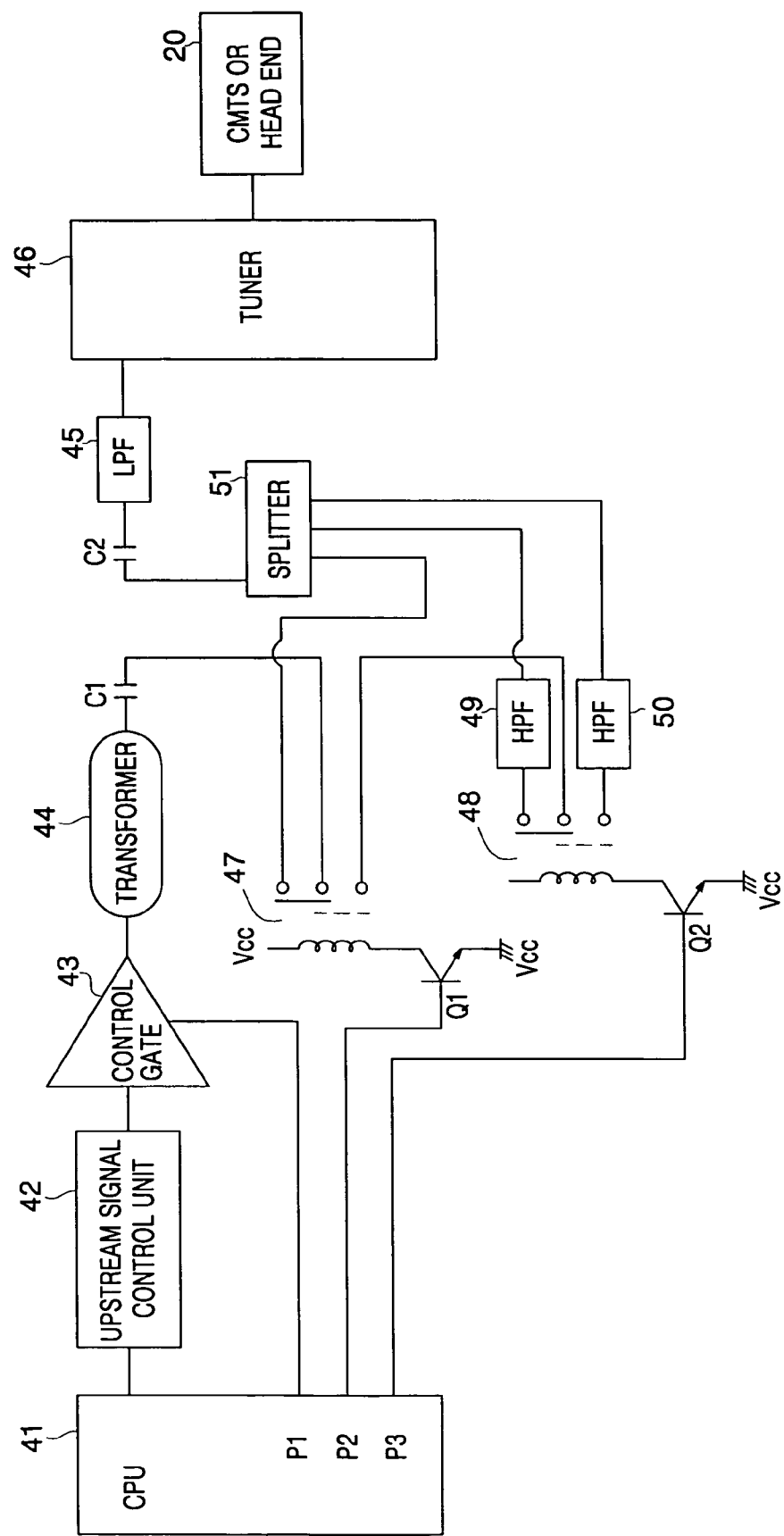
FIG. 3 is a block diagram of a cable modem according to another embodiment of the present invention.

FIG. 3 is a block diagram of a cable modem according to another embodiment of the present invention.

Referring to FIG. 3, the cable modem is composed of a Central Processing Unit (CPU) 41, an upstream signal control unit 42, a control gate 43, a transformer 44, first and second capacitors C1 and C2, a Low-pass Filter (LPF) 45, a tuner 46, first and second switches 47 and 48, a first High-pass Filter (HPF) 49, a second HPF 50, and a splitter 51.

The first switch 47 and the second switch 48 respectively include a transistor Q1 and Q2, a resistor (not shown), and a relay. The transistors Q1 and Q2 can be bipolar transistors or a Field Effect Transistors (FETs).

The CPU 41 has three ports P1, P2 and P3. P1 is a port that outputs a control signal to the control gate 43 to turn the control gate 43 on or off, and is used only to send an upstream signal in response to receiving information transmitted by the CMTS or head end 20.

P2 and P3 are ports that output control signals to control the on/off states of the first switch 47 and the second switch 48 depending on the frequency band for upstream transmission transmitted by the CMTS or head end 20. The frequency band for upstream transmission can be classified into three frequency bands; 10 MHz or less (i.e., 5 MHz to 10 MHz), 10 MHz to 20 MHz, and 20 MHz or more (i.e., 20 MHz to 42 MHz).

Accordingly, when having to send the upstream signal, the CPU 41 outputs the corresponding control signal at the respective ports P1, P2 and P3 depending on the upstream transmission frequency band transmitted by the CMTS or head end 20.

That is, the CPU outputs a high signal at the port P1 to turn the control gate 43 on only if the cable STB or cable modem transmits the upstream signal, but otherwise, always outputs a low signal at the port P1 to turn the control gate 43 off, which prevents any upstream signals from the cable STB or cable modem from being transmitted to the coaxial cable (HFC).

If the upstream transmission frequency transmitted by the CMTS or head end 20 is less than 10 MHz, the CPU 41 outputs a high signal at the first port P1 to turn the control gate 43 on and outputs low signals at the second port P2 and the third port P3 to respectively turn transistor Q1 and transistor Q2 off. Accordingly, the upstream signal is transmitted to the HFC network via the splitter 51, the LPF 45 and the tuner 46, and not via the first HPF 49 and the second HPF 5.

If the upstream transmission frequency transmitted by the CMTS or head end 20 is 20 MHz and more, then the CPU 41 outputs high signals at the second port P2 and the third port P3 to enable transistors Q1 and Q2, such that the upstream signal is transmitted to the HFC network via the second HPF 50, the splitter 51, the LPF 45, and the tuner 46.

If the upstream transmission frequency transmitted by the CMTS or head end 20 is between 10 MHz and 20 MHz, then the CPU 41 outputs a high signal at the second P2 to enable only transistor Q1, such that that the upstream signal is transmitted to the HFC network via the HPF 49, the splitter 51, the low-pass filter 45, and the tuner 46.

The upstream signal control unit 42 performs a function of adjusting the amplitude of the corresponding frequency of the upstream signal depending on the upstream transmission frequency transmitted by the CMTS or head end 20 when sending the upstream signal to the HFC network under the control of the CPU 41. Thus, the upstream signal control unit 42 includes an Automatic Gain Control (AGC) module (not shown) to produce an upstream signal having a stabilized amplitude.

The control gate 43 is used only when sending the upstream signal in response to receiving the information transmitted by the CMTS or head end 20. The control gate 43 blocks noise components in the upstream signal control unit 42 from flowing into the HFC when the upstream signal is not transmitted.

For this purpose, the signal outputted from the first port P1 of the CPU 41 determines the on/off of the control gate 43. That is, if the cable STB or cable modem transmits the upstream signal, the CPU 41 outputs a high signal at the port P1 so that the control gate 43 is on, but otherwise, the CPU 41 always outputs a low signal at the port P1 to turn the control gate 43 off, blocking any upstream signal from the cable STB or cable modem from being transmitted to the coaxial cable HFC.

The transformer 44 receives an output signal from the upstream signal control unit 42 via the control gate 43 and isolates a next stage from the upstream signal control unit 42.

The first capacitor C1 and the second capacitor C2 are used for AC coupling, and remove any DC component from the upstream signal.

The LPF 45 receives an output signal from the splitter 51 and removes a high-frequency component from the signal. It passes only signals having a frequency of 42 MHz or less. The low-pass filter 45 removes signals having a frequency of 42 MHz or more since the upstream signal in use in the modem only uses a 5 to 42 MHz frequency band.

The tuner 46 transmits the upstream signal, the high-frequency component of which has been removed by the LPF 45, to the HFC network.

The first switch 47 is connected to allow the transformer 44 to be directly connected to the splitter 51 so that the upstream signal from the transformer 44 is outputted via the splitter 51 to the LPF 45 when the transistor Q1 constituting the first switch 47 is off. On the other hand, the first switch is connected to allow the upstream signal from the transformer 44 to be outputted to the LPF 45 via the first HPF 49 or the second HPF 50 and the splitter 51 when the transistor Q1 is on.

The second switch 48 performs a switching operation to connect the previous stage to the first HPF 49 when the transistor is off and to connect the previous stage to the second HPF 50 when the transistor is on.

The transformer 44 is directly connected to the splitter so that the upstream signal outputted from the transformer 44 is outputted via the splitter 51 to the LPF 45, and the transformer 44 is connected at the on state so that the signal from the transformer is outputted to the LPF 45 via the first HPF 49 and the splitter 51.

The first HPF 49 passes the 10 MHz or more frequency band and removes the 10 M or less frequency band. It is an HPF selected when the upstream transmission frequency is between 10 MHz to 20 MHz.

The second HPF 50 passes the 20 MHz or more frequency band and removes the 20 M or less frequency band. It is an HPF selected when the upstream transmission frequency is 20 MHz or more.

The splitter 51 is often called a "POTS splitter" in telephone communications. The splitter 51 is a device that splits a telephone signal into two or more signals each transferring selected frequency ranges. It can perform a function of reassembling signals incoming from several places into one signal. Some users connecting to the Internet through an Asymmetric Digital Subscriber Line (ADSL) service can locate the splitter at home and at an office. Others can use services that are not accompanied by a splitter, namely, services that do not require the splitter at home. In the ADSL, the splitter splits an incoming signal in order to send a low frequency to a voice device and a high frequency for data to a computer. A telephone station uses a Plain Old Telephone Service (POTS) splitter in order to send a low frequency voice signal to a telephone network and high-frequency data to a Digital Subscriber Line Access Multiplexer (DSLAM) for Internet transmission.

Thus, the splitter 51 splits the signal passing through the transformer 44 and the signal delivered through the selected one of the first HPF 49 and the second HPF 50 to block interference between the signals.

When the upstream transmission frequency transmitted by the CMTS or head end is less than 10 MHz, the CPU 41 in the cable STB or cable modem outputs a high signal at the first port P1 to turn the control gate 42 on and outputs low signals at the second port P2 and the third port P3.

When the CPU 41 outputs the low signals at the second port P2 and the third port P3, transistor Q1 and transistor Q2 are each turned off and in turn the upstream signal outputted from the transformer 44 is transmitted to the HFC network via the splitter 51, the LPF 45 and the tuner 46, and not via the HPF 1 and the HPF 2.

If the upstream transmission frequency transmitted by the CMTS or head end 20 is 20 MHz or more, then the CPU 41 outputs a high signal at the first port P1 to turn the control gate 42 on and each outputs high signals at the second port P2 and the third port P3. If the CPU 41 outputs the high signals at the second port P2 and the third port P3, transistors Q1 and Q2 are enabled and the relay is activated to connect the transformer 44 to the second HPF 50. Accordingly, the upstream signal outputted from the transformer 44 is delivered to the HFC network via the second HPF 50, the splitter 51, the LPF 45 and the tuner 46.

If the upstream transmission frequency transmitted by the CMTS or head end 20 is between 10 MHz and 20 MHz, then the CPU 41 outputs a high signal at the first port P1 to turn the control gate 42 on and outputs a high signal at the second port P2 and a low signal at the third port P3. Accordingly, only transistor Q1 is enabled and the relay is activated to connect the transformer 44 to the first HPF 49. The upstream signal outputted from the transformer 44 is delivered to the HFC network via the first HPF 49, the splitter 51, the LPF 45, and the tuner 46.

The first port P1 turns the control gate on/off and is activated to send the upstream signal in response to receiving the information transmitted by the CMTS or head end 20. The CPU 41 outputs the high signal at the port P1 so that the control gate 43 is on only if the cable STB or cable modem transmits the upstream signal, but otherwise, always outputs the low signal at the port P1 to turn the control gate off, so that any upstream signal from the cable STB or cable modem is not transmitted to the coaxial cable HFC. In addition, the first capacitor C1 and the second capacitor C2 are used for AC coupling purposes. The capacitors reduce noise by blocking a DC current component from flowing into the HFC.

The HPF connection matrix depending on the states of the ports is as follows. Table 1 below corresponds to a case where the port 1 is at a high state. This is because a low state of the port 1 means that there is no upstream signal transmitted by the cable modem or cable STB.

TABLE 1

| Port2 | Port3 | Q1 | Q2 | Upstream Frequency Path | Upstream Frequency |
|---|---|---|---|---|---|
| Low | Low | Off | Off | Via only LPF, not the first and second HPFs | 5 to 10 MHz |
| Low | High | Off | On | Via only LPF, not the first and second HPFs | 5 to 10 MHz |
| High | Low | On | Off | Via only first HPF and LPF | 10 to 20 MHz |
| High | High | On | On | Via only second HPF and LPF | 20 MHz or more |

In the cable modem 10 of FIG. 1, it is impossible to efficiently use the upstream bandwidth regardless of whether the coaxial cable HFC network includes noise because the 5 to 20 MHz frequency band is always not available when the 20 MHz HPF is used at all times. However, according to the present invention, it is possible to efficiently use the upstream bandwidth since different HPF paths are selected depending on the upstream frequency.

What is claimed is:

1. A cable modem comprising:

a Central Processing Unit (CPU) adapted to output a control signal to perform different high-pass filtering depending on frequency bands of upstream signals transmitted to a Hybrid Fiber Coaxial (HFC) network, with the control signal depending on a frequency band for upstream transmission that the Cable Modem Termination System (CMTS) has transmitted;

the CPU inputting upstream signals to a multiplex High-Pass Filter;

the multiplex High-Pass Filter (HPF) adapted to filter the inputted upstream signals through different paths based on their respective frequency bands, wherein the multiplex HPF includes a first HPF and a second HPF, the first HPF adapted to pass a frequency of at least 10 MHz to high-pass filter upstream signals having a frequency between 10 MHz and 20 MHz and the second HPF adapted to pass a frequency of at least 20 MHz to high-pass filter upstream signals having a frequency of at least 20 MHz; and a High-Pass Filter (HPF) selection unit adapted to select one of the first and the second HPFs included in the multiplex HPF in accordance with the control signal to pass the upstream signals through the different paths wherein the HPF selection unit is adapted to bypass the upstream signals so that upstream signals having a frequency between 5 MHz and 10 MHz are not filtered.

2. The cable modem according to claim 1, further comprising:
an upstream signal control unit adapted to receive the upstream signals from the CPU and to adjust amplitudes of the received upstream signals and to output the resultant upstream signals.

3. The cable modem according to claim 2, further comprising:
a transformer adapted to receive an output signal of the upstream signal control unit and to isolate a next stage from the upstream signal control unit.

4. The cable modem according to claim 1, further comprising:
a Low-pass Filter (LPF) adapted to low-pass filter the upstream signals filtered by the HPF, and to send the resultant filtered signals to the HFC network, the HPF being selected by the HPF selection unit.

5. The cable modem according to claim 4, further comprising:
a tuner adapted to transmit the upstream signals to the HFC network, the high-frequency components of the upstream signals having been removed by the LPF.

6. The cable modem according to claim 1, wherein the CPU is adapted to output different control signals according to respective frequency bands of the upstream signals.

7. The cable modem according to claim 1, wherein the HPF selection unit includes a transistor adapted to be turned on or off in accordance with the control signal of the CPU, and a relay adapted to switch a connection to a corresponding HPF of the multiplex HPF in response to the on or off operation of the transistor.

8. The cable modem according to claim 1, further comprising:
a control gate adapted to be turned on or off by the control signal outputted from the CPU when transmitting the upstream signals, the control gate being in an on state only upon transmitting the upstream signals to the HFC network.

9. The cable modem according to claim 1, further comprising:
a capacitor adapted to remove a DC current component flowing into the HPF.

10. The cable modem according to claim 1, further comprising:
a splitter connected to isolate from each of the first and second high pass filter upstream signals, the upstream signals received from the multiplex HPF.

11. A filtering method comprising:
determining a transmission frequency band of upstream signals received from a Hybrid Fiber Coaxial (HFC) network, the upstream signals being transmitted to the HFC network wherein the frequency band is one of frequency bands for upstream transmission comprising: 5 MHz to 10 MHz, 10 MHz to 20 MHz, and 20 MHz to 42 MHz;
outputting a control signal to perform different high-pass filtering depending on the respective transmission frequency band of the upstream signals, with the control signal depending on a frequency band for upstream transmission that the Cable Modem Termination System (CMTS) has transmitted;
selecting a high-pass filtering path corresponding to the frequency band from among a plurality of different high-pass filtering paths in response to the control signal; and
filtering the upstream signal with the selected high-pass filtering path and transmitting the resultant signal to the HFC network.

12. A method comprising:
outputting a control signal to perform different high-pass filtering depending on frequency bands of upstream signals transmitted to a Hybrid Fiber Coaxial (HFC) network wherein the frequency band is one of frequency bands for upstream transmission comprising: 5 MHz to 10 MHz, 10 MHz to 20 MHz, and 20 MHz to 42 MHz, with the control signal depending on a frequency band for upstream transmission that the Cable Modem Termination System (CMTS) has transmitted;
inputting upstream signals to a multiplex High-Pass Filter;
filtering the inputted upstream signals through different paths based on their respective frequency bands with the multiplex High-Pass Filter (HPF) including a plurality of HPFs having different passband frequencies; and
passing the upstream signals through the different paths by selecting one of the plurality of HPFs included in the multiplex HPF in accordance with the control signal.

13. The method according to claim 12, further comprising:
receiving the upstream signals and adjusting amplitudes of the received upstream signals and outputting the resultant upstream signals.

14. The method according to claim 13, further comprising:
receiving an output signal from an upstream signal control unit and isolating a next stage from the upstream signal control unit with a transformer.

15. The method according to claim 12, further comprising:
low-pass filtering the upstream signals filtered by the HPF and sending the resultant filtered signals to the HFC network.

* * * * *

UNITED STATES PATENT AND TRADEMARK OFFICE
CERTIFICATE OF CORRECTION

PATENT NO. : 7,617,517 B2  Page 1 of 1
APPLICATION NO. : 11/004827
DATED : November 10, 2009
INVENTOR(S) : Shin-Woong Kay It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1285 days.

Signed and Sealed this

Nineteenth Day of October, 2010

David J. Kappos
*Director of the United States Patent and Trademark Office*